US009373119B2

(12) United States Patent
Salesky et al.

(10) Patent No.: US 9,373,119 B2
(45) Date of Patent: Jun. 21, 2016

(54) MACHINE-IMPLEMENTED SYSTEM AND METHOD FOR PROVIDING TIMED TARGETED PROMOTIONAL OFFERS TO INDIVIDUAL PAYMENT ACCOUNT USERS WITH FEEDBACK

(75) Inventors: Joseph H. Salesky, Novato, CA (US); Peter Madams, Benicia, CA (US)

(73) Assignee: Monitise Americas, Inc., San Francisco, CA (US)

( * ) Notice: Subject to any disclaimer, the term of this patent is extended or adjusted under 35 U.S.C. 154(b) by 1860 days.

(21) Appl. No.: 12/191,795

(22) Filed: Aug. 14, 2008

(65) Prior Publication Data

US 2009/0048926 A1 Feb. 19, 2009

Related U.S. Application Data

(60) Provisional application No. 60/956,078, filed on Aug. 15, 2007.

(51) Int. Cl.
*G06Q 30/02* (2012.01)
*G06Q 20/10* (2012.01)

(52) U.S. Cl.
CPC .............. *G06Q 30/02* (2013.01); *G06Q 20/10* (2013.01); *G06Q 30/0211* (2013.01); *G06Q 30/0215* (2013.01); *G06Q 30/0224* (2013.01); *G06Q 30/0225* (2013.01)

(58) Field of Classification Search
USPC ...................... 705/14.17, 14.25, 14.35, 14.71
See application file for complete search history.

(56) References Cited

U.S. PATENT DOCUMENTS

| 4,674,041 A | * | 6/1987 | Lemon et al. | ............... | 705/14.35 |
| 4,723,212 A | * | 2/1988 | Mindrum et al. | .......... | 705/14.26 |
| 4,750,119 A | * | 6/1988 | Cohen et al. | ............... | 705/14.34 |
| 4,882,675 A | * | 11/1989 | Nichtberger et al. | ...... | 705/14.35 |

(Continued)

FOREIGN PATENT DOCUMENTS

| JP | 1801167 | 1/2006 |
| JP | 2006244151 A | 9/2006 |

(Continued)

OTHER PUBLICATIONS

International Search Report PCT/US2008/009751 dated Mar. 4, 2009.

(Continued)

*Primary Examiner* — David Stoltenberg
(74) *Attorney, Agent, or Firm* — Perkins Coie LLP

(57) ABSTRACT

A machine-implemented method includes determining when a particular promotional offer which is associated with a payment account of a particular consumer should be released to the particular consumer, and then transmitting a first message indicating the particular promotional offer to a device of the particular consumer. The first message indicates the merchant and the terms of the offer, which may include a specific time period during which the offer is valid. The method further includes detecting that the particular consumer has accepted the offer and, in response, automatically transmitting a second message to trigger a transfer of funds to an account of the consumer. The method can further include, in response to detecting that the consumer has accepted the offer, automatically and immediately transmitting a message to the consumer to confirm the transfer of funds to the account of the consumer, so as to provide feedback to the consumer.

22 Claims, 4 Drawing Sheets

(56) References Cited

U.S. PATENT DOCUMENTS

| | | | |
|---|---|---|---|
| 4,941,090 A * | 7/1990 | McCarthy | 705/14.17 |
| 4,949,256 A * | 8/1990 | Humble | 705/14.17 |
| 5,025,372 A * | 6/1991 | Burton et al. | 705/14.17 |
| 5,684,951 A | 11/1997 | Goldman et al. | |
| 5,740,361 A | 4/1998 | Brown | |
| 5,809,415 A | 9/1998 | Rossmann | |
| 5,912,887 A | 6/1999 | Sehgal | |
| 5,951,694 A | 9/1999 | Choquier et al. | |
| 5,974,398 A * | 10/1999 | Hanson et al. | 705/14.64 |
| 6,138,162 A | 10/2000 | Pistriotto et al. | |
| 6,253,189 B1 * | 6/2001 | Feezell et al. | 705/14.61 |
| 6,292,833 B1 | 9/2001 | Liao et al. | |
| 6,401,085 B1 | 6/2002 | Gershman et al. | |
| 6,424,841 B1 | 7/2002 | Gustafsson | |
| 6,490,627 B1 | 12/2002 | Kalra et al. | |
| 6,771,971 B2 | 8/2004 | Smith | |
| 6,880,751 B2 * | 4/2005 | Okamura et al. | 235/380 |
| 6,938,087 B1 | 8/2005 | Abu-Samaha | |
| 6,959,185 B1 | 10/2005 | Stage et al. | |
| 6,996,409 B2 * | 2/2006 | Gopinath et al. | 455/466 |
| 7,020,685 B1 | 3/2006 | Chen et al. | |
| 7,225,143 B1 | 5/2007 | Kepecs | |
| 7,302,254 B2 | 11/2007 | Valloppillil | |
| 7,343,168 B2 | 3/2008 | Valloppillil | |
| 7,392,222 B1 | 6/2008 | Hamilton et al. | |
| 7,480,723 B2 | 1/2009 | Grabelsky et al. | |
| 7,844,674 B2 | 11/2010 | Madams et al. | |
| 7,870,201 B2 | 1/2011 | Madams et al. | |
| 7,870,202 B2 | 1/2011 | Madams et al. | |
| 2001/0032232 A1 | 10/2001 | Zombek et al. | |
| 2002/0026353 A1 * | 2/2002 | Porat et al. | 705/14 |
| 2003/0163540 A1 | 8/2003 | Dorricott | |
| 2003/0200272 A1 | 10/2003 | Campise et al. | |
| 2003/0212595 A1 | 11/2003 | Antonucci | |
| 2003/0216967 A1 | 11/2003 | Williams | |
| 2003/0227892 A1 | 12/2003 | Cabana | |
| 2004/0030897 A1 | 2/2004 | Hua et al. | |
| 2004/0039827 A1 | 2/2004 | Thomas et al. | |
| 2004/0092272 A1 | 5/2004 | Valloppillil | |
| 2004/0092273 A1 | 5/2004 | Valloppillil | |
| 2004/0193694 A1 | 9/2004 | Salo et al. | |
| 2004/0255329 A1 | 12/2004 | Compton et al. | |
| 2005/0131832 A1 | 6/2005 | Fransdonk | |
| 2005/0132060 A1 | 6/2005 | Mo et al. | |
| 2005/0193130 A1 | 9/2005 | Logue et al. | |
| 2006/0277103 A1 | 12/2006 | Fujita et al. | |
| 2008/0154757 A1 | 6/2008 | Barros et al. | |

FOREIGN PATENT DOCUMENTS

| | | |
|---|---|---|
| JP | 2007079626 A | 3/2007 |
| KR | 1020040063420 | 7/2004 |
| KR | 1020050089524 | 9/2005 |
| KR | 1020060034983 | 4/2006 |
| WO | WO-2007146016 A2 | 12/2007 |

OTHER PUBLICATIONS

International Search Report PCT/US06/44284 dated Mar. 25, 2008.
Co-pending U.S. Appl. No. 11/280,140 of Madams, P.H.C., et al., filed Nov. 15, 2005.
Non-Final Office Action Mailed Sep. 8, 2008 in Co-Pending U.S. Appl. No. 11/280,140 of Madams, P.H.C., et al., filed Nov. 15, 2005.
Final Office Action Mailed Sep. 14, 2009 in Co-Pending U.S. Appl. No. 11/280,140 of Madams, P.H.C., et al, filed Nov. 15, 2005.
Notice of Allowance Mailed Apr. 9, 2010 in Co-Pending U.S. Appl. No. 11/280,140 of Madams, P.H.C., et al., filed Nov. 15, 2005.
Notice of Allowance Mailed Jun. 3, 2010 in Co-Pending U.S. Appl. No. 11/280,140 of Madams, P.H.C., et al., filed Nov. 15, 2005.
Notice of Allowance Mailed Jul. 28, 2010 in Co-Pending U.S. Appl. No. 11/280,140 of Madams, P.H.C., et al., filed Nov. 15, 2005.
Co-pending U.S. Appl. No. 11/422,317 of Madams, P.H.C., et al., filed Jun. 5, 2006.
Non-Final Office Action Mailed Sep. 8, 2008 in Co-Pending U.S. Appl. No. 11/422,317 of Madams, P.H.C., et al., filed Jun. 5, 2006.
Final Office Action Mailed Aug. 20, 2009 in Co-Pending U.S. Appl. No. 11/422,317 of Madams, P.H.C., et al., filed Jun. 5, 2006.
Notice of Allowance Mailed Jan. 15, 2010 in Co-Pending U.S. Appl. No. 11/422,317 of Madams, P.H.C., et al., filed Jun. 5, 2006.
Notice of Allowance Mailed Sep. 8, 2010 in Co-Pending U.S. Appl. No. 11/422,317 of Madams, P.H.C., et al., filed Jun. 5, 2006.
Co-pending U.S. Appl. No. 11/422,318 of Madams, P.H.C., et al., filed Jun. 5, 2006.
Non-Final Office Action Mailed Sep. 15, 2008 in Co-Pending U.S. Appl. No. 11/422,318 of Madams, P.H.C., et al., filed Jun. 5, 2006.
Notice of Allowance Mailed Dec. 3, 2009 in Co-Pending U.S. Appl. No. 11/422,318 of Madams, P.H.C., et al., filed Jun. 5, 2006.
Notice of Allowance Mailed Sep. 23, 2010 in Co-Pending U.S. Appl. No. 11/422,318 of Madams, P.H.C., et al., filed Jun. 5, 2006.
Financial Institution—http://en.wikipedia.org/wiki/Financial_institution (2011) 3 pages.
International Search Report and Written Opinion mailed Jun. 19, 2008 for International Application No. PCT/US2006/044261, 9 pages.
International Search Report and Written Opinion mailed Mar. 4, 2009, for International Application No. PCT/US2008/009751, 8 pages.
International Search Report and Written Opinion mailed Mar. 25, 2008, for International Application No. PCT/US2006/044284, 12 pages.

* cited by examiner

MACHINE-IMPLEMENTED SYSTEM AND METHOD FOR PROVIDING TIMED TARGETED PROMOTIONAL OFFERS TO INDIVIDUAL PAYMENT ACCOUNT USERS WITH FEEDBACK

This application claims the benefit of U.S. provisional patent application No. 60/956,078 of P. Madams et al., filed on Aug. 15, 2007 and entitled, "Methods and Systems that Provides Integration with Back End Systems with a Single Implementation," which is incorporated herein by reference.

FIELD OF THE INVENTION

At least one embodiment of the present invention pertains to a system and technique for providing specifically-timed, targeted promotional offers to individual credit/debit card users or users of other types of payment accounts, with timely and specific feedback.

BACKGROUND

Promotional campaigns such as marketing and advertising, are ubiquitous mechanisms for inducing consumers to consume, i.e., to purchase goods and services. For example, merchants often issue coupons as incentives for consumers to buy their goods and rewards cards. Credit card issuers often award points/credits/rewards as incentives for consumers to use their credit cards.

To develop an effective promotional campaign, it is very important for the promoter (e.g., the merchant or the credit card issuer) to have timely, quality feedback regarding whether and in what manner their promotional offers are actually acted upon by consumers. In this regard, conventional promotional campaigns have shortcomings.

With conventional promotional campaigns, it is difficult or impossible to know how effective the campaign was, because there is no direct feedback provided to the promoter regarding which particular consumers acted upon the offer, exactly when they acted upon it, etc. This is because traditional promotional campaigns target a broad segment of consumers, not individuals, since it is often cost-prohibitive to target consumers on an individual basis. Consequently, results of promotional campaigns are often difficult to measure.

Sometimes only statistical data is available to the promoter, perhaps months after the campaign has ended. For example, an increase in sales of a particular product may or may not be attributable to a marketing campaign of television and radio advertisements over the previous three months, and there is often no way for the promoter to know whether any particular consumer was even aware of the offer. Campaigns such as these can be very expensive.

Giving consumers paper coupons helps to quantify results, because coupon redemption can be tied to specific sales, which might not have been made without the coupon. However, coupons are expensive to print and distribute to consumers. Further, it is expensive to train agents at the point of sale (POS) terminals to recognize valid coupons, to avoid expired coupons or fakes, and to take the extra time to handle the coupon. Collecting and collating the redeemed coupons, which is critical to collecting the campaign results, also adds cost.

Technology is increasingly being used to alleviate some of the drawbacks of traditional coupon campaigns. For example, all-electronic coupons, delivered as email or short message service (SMS) messages, can avoid the paper handling costs when the POS terminal is able to capture the coupon information.

In one known promotional campaign, a credit card issuer and a fast food chain collaborated to award a free purchase to the consumer after a certain number of purchases by the consumer at the restaurant with a particular credit card. The campaign was a targeted mass mailing. A central, computer-implemented event engine detected the Nth purchase with the credit card and then applied a credit to the card. This avoided the overhead of POS integration and training. However, the important feedback to the consumer did not occur at the time of the sale, in the restaurant, when using the designated credit card. Instead, the feedback to the consumer came much later, with the monthly credit card bill, where it may or may not have been noticed by the consumer. Further, while specific data was available about which customers received the reward, there was no way to correlate the costs of the marketing campaign with any particular sales.

In addition, credit card rewards programs have drawbacks for the card issuer. While the card issuer generally earns money for each use of the card (typically a percentage of the transaction, interchange fee, etc.), the cost of the rewards partially offsets that income.

Thus, conventional promotional campaigns tend to be expensive and/or fail to provide timely and specific feedback to the promoter and the consumer.

SUMMARY

A system and method are introduced here for providing timed, targeted promotional offers to individual users of payment accounts (consumers), such as credit/debit card users, with timely and specific feedback regarding acceptance of such offers being provided to promoters and consumers. In one embodiment, the method is a machine-implemented method which includes determining precisely when a particular promotional offer should be released to a particular consumer based on, for example, analysis of the purchasing history of the particular consumer with a particular credit/debit card, and then transmitting a first message indicating the particular promotional offer to a device of the particular consumer. The first message indicates the merchant and the terms of the offer, which may include a specific time period during which the offer is valid. The method further includes detecting (preferably in real-time or near real-time) that the particular consumer has accepted the offer and, in response, automatically transmitting a second message to trigger a transfer of funds to an account of the consumer. The second message may be transmitted to the card issuer (e.g., a bank or merchant), for example. The method can further include, in response to detecting that the consumer has accepted the offer, automatically (and preferably immediately) transmitting a message to the consumer to confirm the transfer of funds to the account of the consumer, so as to provide immediate feedback to the consumer.

The offer in this technique requires no paper handling or coupon redemption. No change is required to existing equipment at the POS terminal or other merchant equipment. No personnel need to be trained in handling the offer. The targeting and timing of offer release and processing of offer acceptance are all automatic.

Advantageously, this technique is closed loop: Unlike conventional marketing campaigns where is it difficult or impossible to know how effective the campaign was, this technique is able to report simply, accurately and quickly on how many consumers acted upon the offer and which particular consumers did so. This additional business intelligence can be used to modify future offers so as to make them more effective. Further, this technique allows the targeting of individual consumers, which is much more effective than mass marketing, at a relatively low cost.

With the technique introduced here, the card issuer can earn money, for example, by receiving payment from the merchant, using some of that revenue for the reward to the consumer, and keeping the rest. Further, the card issuer may auction off certain "offer slots" to merchants, allowing the choice to be made of the most effective and most lucrative offers.

Other aspects of the technique introduced here will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
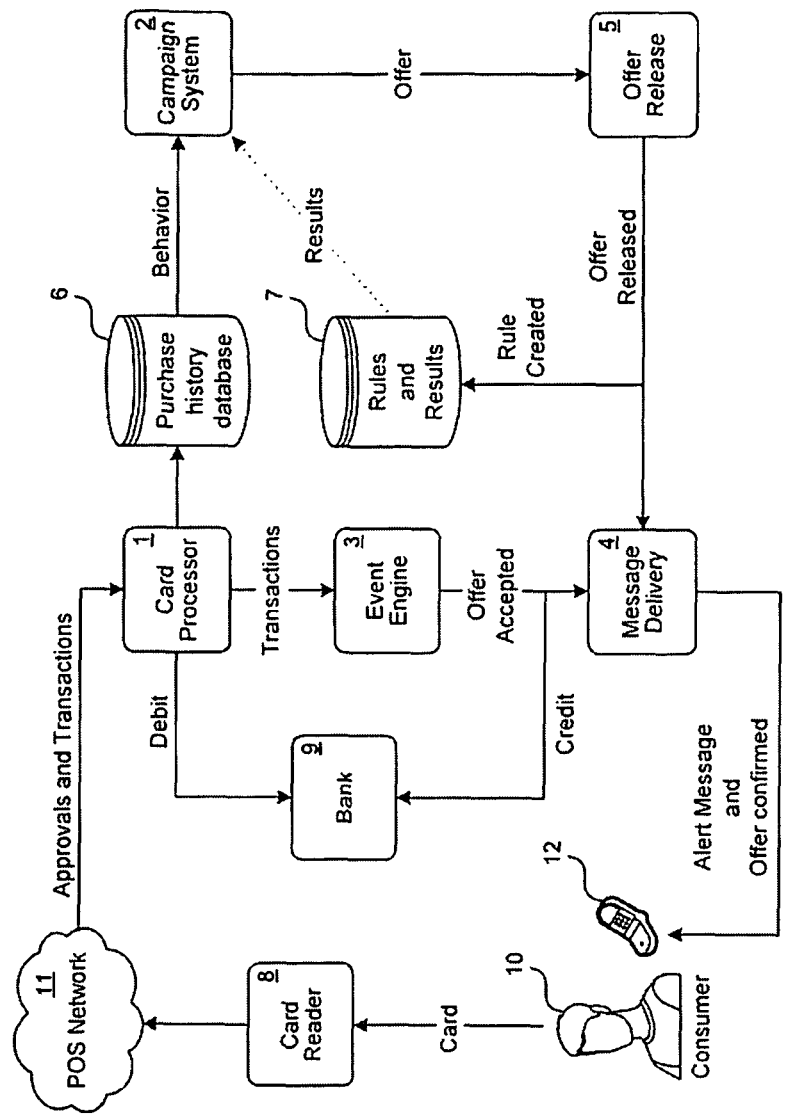
FIG. 1 is a block diagram of a closed-loop system for providing targeted promotional offers to consumers and detecting acceptance of such offers.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The term "merchant", as used herein, means any person or entity which provides a product or service to a consumer as part of a business transaction.

The term "payment account", as used herein, is meant to include credit/debit card accounts, checking accounts, money market accounts, PayPal accounts and other similar online services, or any other type of account which a consumer can use to pay for goods or services.

The term "credit/debit", as used herein (such as in credit/debit card, credit/debit account or credit/debit transaction) means that the card, account or transaction is: a credit card, account or transaction; a debit card, account or transaction; or a combination of a credit and debit card, account or transaction. In certain instances below the term "credit" is used by itself (i.e., not "credit/debit") to simplify description; it will be recognized, however, that the description is also applicable to debit-type transactions and applications.

The term "promoter", as used herein, means the initiator of a promotional offer or marketing campaign, such as a merchant or credit card issuer or a party who has a business relationship with a merchant or credit card issuer.

The term "promotional", as used herein, refers to anything that is specifically designed or intended to induce or encourage a consumer to consume, e.g., to buy, rent, lease etc, goods or services.

In one embodiment, the system introduced here determines precisely when a particular promotional offer should be released to a particular consumer based on, for example, analysis of the purchasing history of the particular consumer with a particular credit/debit card. The system then transmits a first message indicating the particular promotional offer to a device of the particular consumer, such as a cell phone, pager, personal digital assistant (PDA), personal computer (PC) or the like. The first message may be, for example, an SMS alert, and indicates the merchant and the terms of the offer, which may include a specific time period during which the offer is valid. The system detects (preferably in real-time or near real-time) that the particular consumer has accepted the offer and, in response, automatically transmits a second message to trigger a transfer of funds to an account of the consumer, such as the consumers credit/debit card account. The second message may be transmitted to the bank of the consumer, for example.

The method can further include, in response to detecting that the consumer has accepted the offer, automatically (and preferably immediately) transmitting a message to the consumer to confirm the transfer of funds to the account of the consumer, so as to provide immediate feedback to the consumer. In connection with this operation, the term "immediate" or "immediately" shall be defined to mean within one hour from the time acceptance of the offer by the consumer is detected. Providing immediate feedback to the consumer can be extremely valuable to the promoter, because a consumer is more likely to respond positively to future offers when he gets immediate feedback of a funds transfer to his account following a purchase.

Note that while the technique introduced here is described in terms of credit/debit accounts, it can also be easily used in connection with essentially any other type of payment account of a consumer.

Consider now an example of the technique described above. Assume A particular person, Consumer A, shops at a particular store, Store X, about once every six weeks. Sending a promotional offer to Consumer A after four weeks, on a Friday afternoon or Saturday morning—e.g., a $25 credit for shopping at Store X tomorrow—might encourage Consumer A to make an extra trip to Store X. Instead of advertising a "Sale at Store X today", the merchant is able to take those same funds (i.e., the funds which he would otherwise forfeit through the sale and use for associated ads) and apply them to a much more focused marketing campaign as described herein. The amount of the offer would relate to the typical purchases that Consumer A makes at Store X. The offer can be delivered as a real time message, for instance an SMS message sent to Consumer A's mobile phone at the chosen time of day.

If Consumer A does act upon the offer within the specified timeframe, a computer-implemented event engine detects this in real time, and within moments, another real-time message can be sent to Consumer A's phone confirming that the credit has been applied to her card. Having the credit card issuer, e.g., the consumer's bank, reach out to the consumer in this way adds to the perceived value of this credit card issuer in the mind of the consumer, which enhances consumer loyalty and "stickiness" (a consumer's tendency not to switch to a competitor). Note that the card issuer might be the consumer's bank, the merchant or the credit association. For example, the offer could be an offer from Wells Fargo to use a Wells Fargo credit card; or from Nordstrom's to use a Nordstrom's card; or from VISA to use a VISA card.

As noted above, this technique is closed loop, in that it is able to report simply and accurately on how many consumers acted upon the offer and which consumers did so, unlike most marketing campaigns where is it hard or impossible to know how effective it was. Making an offer and knowing almost immediately whether the offer worked is extremely valuable information for promoter to have. This additional business intelligences can also be used to compose/modify the next offer, to be more effective. For example, the feedback may result in the conclusion that the offer should be $50 for Consumer A, or that it should be sent on a Saturday instead of a Friday.

With conventional incentive programs, the card issuer gives away points/credits/rewards as incentives for consumers to use the card, which costs the card issuer money. Of course, the card issuer will earn money for each card transaction, but the incentive program takes away from that income. With the technique introduced here, the opposite occurs: the card issuer earns money. The card issuer receives payment from the merchant, uses some of that revenue for the reward to the consumer, and keeps the rest. For simplicity of explanation, in the example below, the card issuer is designated as operating the system introduced here, however, as noted other entities may benefit from running the system directly.

Note that this technique introduced here applies to both credit cards and debit cards, although their transactions may be processed differently.

FIG. 1 shows a system for providing targeted promotional offers to consumers and detecting acceptance of such offers, in accordance with a technique introduced here. The system includes various functional modules including a card processor 1, a campaign system 2, an event engine 3, a message delivery module 4, and an offer release module 5. In at least one embodiment, these functional modules are implemented in the form of software and/or firmware that executes on one or more general-purpose computer systems. The system further includes a purchase history database 6 and a rules and results database 7. In certain embodiments, these modules are all operated by one business entity, such as a credit card association (e.g., Visa or MasterCard), although that does not have to be the case.

The main functions of the card processor 1 are to process (authorize or reject) requested credit/debit card transactions by consumers 10, as received from card readers 8 through the POS network 11, and to record such transactions in the purchase history database 6. The card processor 1 performs this function for all transactions at all merchants, for all cards issued by the card issuer (or the entity which operates the card processor 1). When a transaction is authorized, the card processor 1 triggers a payment from the issuing bank 9. The purchase history database 6 stores information indicating a specific purchase history for each consumer who has a credit/debit card issued by a particular card issuer.

The campaign system 2 mines the purchase history database 6 (which may be distributed or replicated across multiple locations) to recognize shopping habits. More specifically, the campaign system 2 determines purchasing behavioral patterns of individual consumers from the purchase history database 6, receives results from the rules and results database 7 (described below) indicative of consumers' responses (or lack thereof) to promotional offers, and uses these inputs collectively to generate new promotional offers for individual consumers. An example of the kind of knowledge that might be mined by the campaign system 2 is, for example, Consumer A spends $X once every six weeks at Merchant M on average. Various types of marketing campaign systems and mining algorithms are well known in the art (usually, this done by a merchant at the merchant's own database), which can be adapted for this purpose; the details of such systems and algorithms are not required for an understanding of the technique being introduced here. Using the technique introduced here, any of various entities, such as the merchant, card issuer, loyalty program processor, etc., is able to use the acquired data for marketing and so earn new income, in some cases where this was not possible before.

An offer generated by the campaign system 2 may include information specifying, for example, a specific consumer, merchant, credit/debit card, amount of discount, optionally one or more specific products or services of the merchant to which the offer applies, the time period during which the offer is valid, and possibly a special code that can be input by the consumer when making a purchase. At least some of these items of information can be checked against event conditions by the event engine 3 to determine when an offer has been accepted, as described below. An offer can be represented and stored as a rule in the extensible markup language (XML) Path Language (XPath), as discussed further below.

An offer is generated as a result of analysis of historical card usage data. When the campaign system 2 detects a consumer's repeated shopping at a particular merchant, it can generate an offer and specify that it be delivered, in real-time, at the most effective time, to encourage an unplanned purchase at the merchant by the consumer. The funds for the offer come from the merchant, and the card issuer gets paid for all transactions as well as for making the offer.

The offer release module 5 determines when to release each particular promotional offer to a particular consumer. The actual transmission of the offer is performed by the message delivery module 4. An offer can be sent to a consumer by the message delivery module 4 in the form of an SMS alert sent to the consumer's mobile device, for example. Alternatively, delivery of the offer might be by paper mail, email, web-site insertions, or any other conventional communication modality. When an offer is released, the offer release module 5 stores the offer in the form of a rule in the rules and results database 7. For example, the rule can specify, in essence: If THIS CARD is used at THIS MERCHANT within THIS TIMEFRAME, then generate an "offer accepted" event. In certain embodiments, each rule is represented in the rules database 7 in XPath.

The specific timing of the release of an offer is determined by the offer release module 5. There are various ways of implementing this timing determination, such as:

Release time corresponding to past shopping behavior: For example, the appropriate release time might be Friday afternoon, if the usual shopping pattern of the consumer is to shop during the weekend. Similarly, if the consumer tends to visit a particular merchant once every six weeks on average, it might be appropriate to release an offer three or four weeks after the last visit, to encourage and asked her visit.

Consumer behavior triggered release (e.g., release triggered by adjacent transactions): Detecting a transaction at another nearby business may trigger the release of an offer. In this approach, the offer release module may monitor the real-time transaction stream from the card processor.

Location Based Services (LBS) triggered release: LBS can be used to trigger release of marketing offer, perhaps in combination with the behavioral targeting mentioned above. For example, if it is known that the consumer is near a particular merchant, a special offer may induce the consumer to make an additional visit/purchase.

The offer release module 5 can also use information on the effectiveness of previous offers to fine-tune the timing of release of a new offer.

The event engine 3 receives transactional information describing credit/debit card transactions from the card processor 1. Preferably this transaction information is received as a real-time or near real-time feed, i.e., information on a transaction is received immediately after the transaction occurs. This can include the same information which the card processor 1 stores in the purchase history database 6. The benefit of receiving this information in real-time is that both the promoter and the consumer can receive real-time feedback when an offer is accepted. For each transaction, the transaction information sent to the event engine 3 can include, for example, the name of the cardholder (consumer), the time, date and amount of the transaction, the name of the merchant and possibly a special code linking the transaction to a promotional offer. Thus, the event engine 3 monitors the transaction information received from the card processor 1 and determines whether each transaction matches any rule stored in the rules and results database 7. Detecting a match means that an offer has been accepted by a consumer. If the rules are represented in XPath, the event engine 3 can use an XSL Transformation (XSLT), for example, to detect matches between incoming XML transaction information and stored rules. Note that the operation of the event engine 3 is not done in the same path that authorizes the transaction, so there is not impact on the critical fast response needed there.

In certain embodiments, as noted above, the transaction data is represented as an XML document, and the rules are represented using XPath. In the context of the technique introduced here, XPath can be used to select nodes from each transaction. XPath can specify computations, including Boolean expressions, such as (TransactionAmount>UsersThreshold). By using an XSLT, the XPath rules can be applied to each (XML) transaction in turn, and if the Boolean result is TRUE, then the event (e.g., "Offer Accepted") is generated.

Using this approach, the event engine 3 is able to handle many different rules types without the need to reprogram it. The following is an example of a generic rule written using XPath. In this example the rule checks for balance amounts less than a threshold amount that the user sets.

```
//alertSrc:sourceEvent/alertSrc:accountActivityEvent/
alertSrc:balances/alertSrc:balance[alertSrc:amount < ${threshold}]
```

The XPath rule as entered into the rules database for a particular user with threshold of $200 would be:

```
//alertSrc:sourceEvent/alertSrc:accountActivityEvent/
alertSrc:balances/alertSrc:balance[alertSrc:amount < ${200}]
```

The following XML Schema defines the transaction data that would be matched by this rule:

```
<?xml version="1.0" encoding="UTF-8"?>
<xsd:schema
xmlns:alertSrc="http://schemas.clairmail.com/2008/02/AlertSourceContent
"
    xmlns="http://www.w3.org/2001/XMLSchema"
    elementFormDefault="qualified"
    targetNamespace="http://schemas.clairmail.com/2008/02/AlertSourceContent
"
    xmlns:xsd="http://www.w3.org/2001/XMLSchema">
    <xsd:complexType name="Event_Type">
        <xsd:sequence>
            <xsd:element name="sourceEvent" type="alertSrc:sourceEvent" minOccurs="1"/>
        </xsd:sequence>
    </xsd:complexType>
    <xsd:complexType name="sourceEvent">
        <xsd:annotation>
            <xsd:documentation>
                The alert-source event. Can be an account activity event or
a service notification event.
                The event must have two required attributes; the timestamp
and the mode.
            </xsd:documentation>
        </xsd:annotation>
        <xsd:sequence>
            <xsd:element name="accountActivityEvent" type="alertSrc:AccountActivityEvent_Type"minOccurs="0"/>
            <xsd:element name="serviceNotificationEvent" type="alertSrc:ServiceNotificationEvent_Type" minOccurs="0"/>
        </xsd:sequence>
        <xsd:attribute name="timestamp" type="xsd:dateTime" ="required"/>
        <xsd:attribute name="mode" type="alertSrc:mode_Enum" use="required"/>
    </xsd:complexType>
    <xsd:complexType name="Balances_Type">
        <xsd:sequence>
            <xsd:element name="balance" type="alertSrc:Balance_Type" maxOccurs="unbounded"/>
        </xsd:sequence>
    </xsd:complexType>
    <xsd:complexType name="Balance_Type">
        <xsd:complexContent>
            <xsd:extension base="alertSrc:Amount_Type">
                <xsd:annotation>
```

```
            <xsd:documentation>
                type defines the balance type. e.g. avail-bal, current-bal
                amount is the balance amount
            </xsd:documentation>
        </xsd:annotation>
        <xsd:sequence>
            <xsd:element name="type" type="xsd:string"/>
        </xsd:sequence>
    </xsd:extension>
  </xsd:complexContent>
  <xsd:complexType name="Amount_Type">
        <xsd:sequence>
            <xsd:element name="currencyCode" type="xsd:string"
minOccurs="0"/>
            <xsd:element name="amount" type="xsd:decimal"/>
        </xsd:sequence>
    </xsd:complexType>
</xsd:schema>
```

Operations of the event engine 3, offer release module 5 and message delivery module 4 are automatic, i.e., they requires no user intervention. Other rules that can be stored in the rules and results database and checked by the event engine might include large transactions, limits reached, questionable activity that might be fraud, etc.

When the event engine 3 detects that an offer has been accepted, it sends a message to the consumer's bank 9, authorizing a credit/discount to be applied to the account of the consumer in the amount specified by the offer. Preferably, the message delivery module also at this time sends a message to the consumer, for example in the form of an SMS alert sent to the consumer's mobile device 12, thus providing immediate feedback to the consumer (e.g., "A credit of $Y has been applied to your account"). In addition, when an offer is accepted the event engine 3 also updates the rules and results database 7 to reflect this event, as well as removes the rule or marks it as executed. From time to time (e.g. periodically), the results in this database are sent to or accessed by the campaign system for use in generating offers.

The system (e.g., the event engine 3 or some other functional module) also periodically checks the rules and results database 7 for expired offers. These are removed from the database 7 or marked as not-executed. This negative result is stored in the database 7 or a separate database to give accurate feedback on this promotional campaign and to support future campaigns.

The system introduced here is thought to work best when used as a real-time system using alert messages to the consumer. This allows for the best choice of delivery time and gives the consumer immediate feedback at the time of sale. Nonetheless, the system will also work with batch operations, though losing some of the benefit of these two points.

Today, SMS text messages are an effective technique for pushing real-time message to consumers. Other techniques are also possible, however, such as email and instant messaging, using somewhat different communications protocols, and in the future, still other techniques such as multimedia messaging service (MMS) may also be used. This description uses the terms "alert" and "message" to include any one or more of these communication modalities.

Mobile devices such as cell phones and PDAs are very personal, typically carried all the time and often answered immediately. These attributes make them an excellent tool to use for marketing purposes. Yet many consumers object to intrusive marketing offers. The use of telephone calls for marketing—being most intrusive—has led to legislation in many countries prohibiting or limiting access only to those consumers who "opt-in".

SMS text messaging is a less intrusive way to reach out to a consumer, and with careful use of opt-in controls, is an excellent vehicle for delivering real-time marketing messages. The number of merchants (and other entities) who want to contact consumers may far exceed the number of SMS messages the average consumer will tolerate in any given time period. However, the system introduced here can be operated strictly as an opt-in system, i.e., where the consumer signs up for special offers on his card.

Note there are other reasons for a consumer to share his mobile phone number with a card provider. For example, services such as fraud detection or questionable card activity can be ameliorated by using real-time text messaging. Today, if a questionable transaction is detected (another kind of event for which the event engine can watch), the card issuer has two choices: 1) accept the (possibly fraudulent) transaction and risk the loss, or 2) reject the (possibly valid) transaction and upset the consumer. With the technique introduced here, questionable activity can give rise to an event that sends an alert to the consumer, asking for confirmation that the transaction is valid, and taking immediate steps to prevent any fraud if it is not. Another example is mobile banking, which gives the consumer the ability to check on account/card balances and recent transactions by sending in an SMS request and receiving the desired information in reply.

A card issuer may determine that no more than a small, limited number of offers should be made to a particular consumer during a particular time. Therefore, certain "offer slots" can be "auctioned" to merchants, allowing the choice to be made of the most effective and most lucrative offers. Note that unlike classic advertising where the costs are per-imprint or per-copy display (CPM), the system introduced here (in one embodiment) only pays when the consumer acts upon the offer, i.e., cost per action (CPA). The optimization of which offers to take, which are most likely to be accepted and which offers result in the highest income can be fine tuned using the results data.

Another factor that the offer release module 5 can take into account in determining when to release offers is the results of the above-mentioned "auction". When there are more offers than a consumer will tolerate in a given period of time, the system allows for "selling the slot to the highest bidder" or optimization of the offer (not necessarily the highest value offer, but perhaps the offer most likely to be accepted). Making an offer from a merchant who will pay well earns nothing if the offer is not accepted. Offers that are very attractive to the consumer (large credit for instance) but with low value to the card issuer are not optimal either. The technique introduced here allows for optimization in selecting the best offer and releasing it at the best time, to give the highest value to both the consumer and the card issuer.

Figure 2:
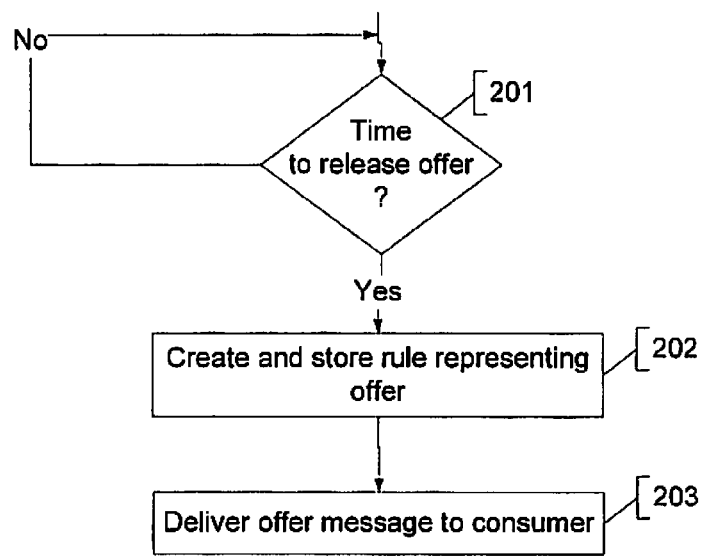
FIG. 2 is a flow diagram illustrating an offer release process.

FIG. 2 is a flow diagram illustrating an example of an offer release process which can be performed by the offer released module. At 201 the process decides whether it is time to release a particular offer to a particular consumer, which decision may be based on, for example, the consumer's shopping history, as described above. If it is not time to release an offer, the process loops back to 201 until it is time to do so. When it is time to release an offer, then at 202 the process creates a rule in the rules and results database, representing the offer. The process then triggers the message delivery module to deliver the message to the consumer at 203.

Figure 3:
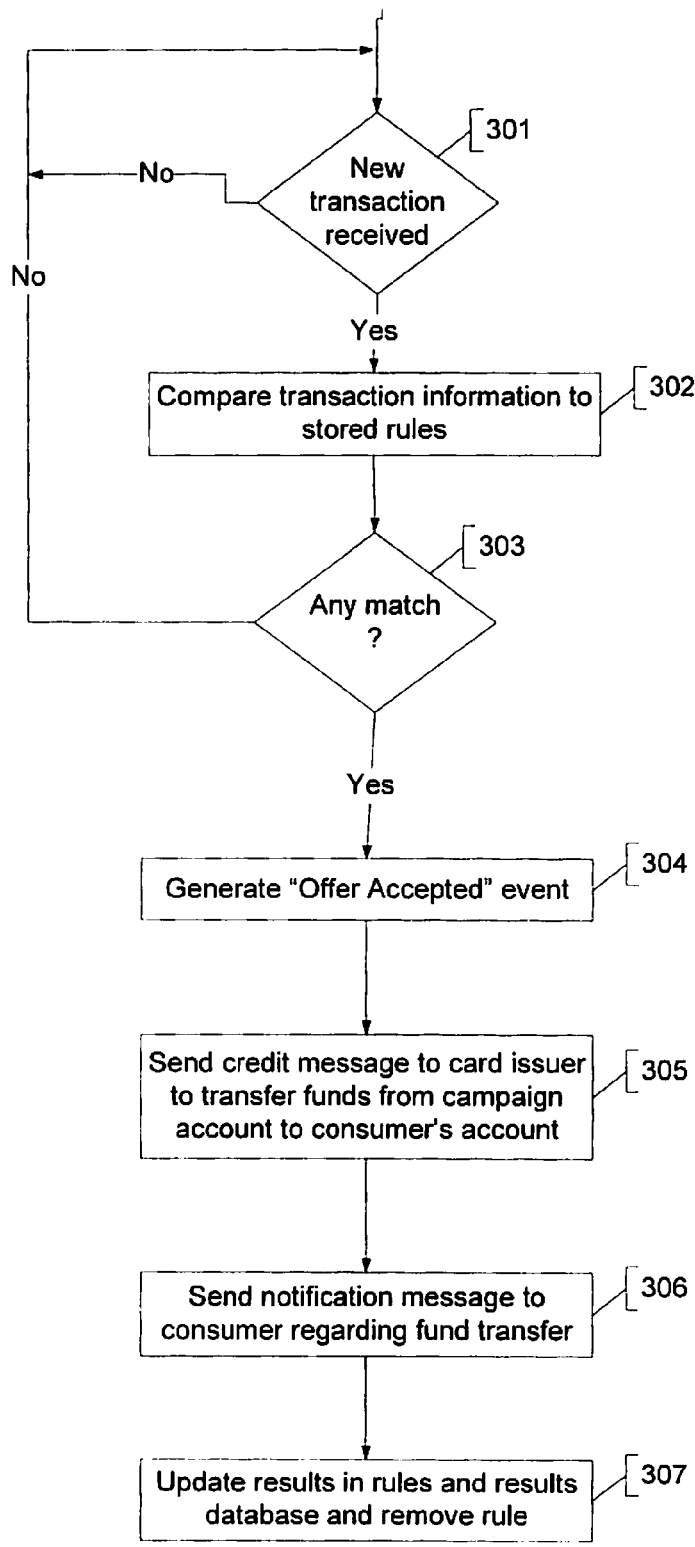
FIG. 3 is a flow diagram illustrating a process for detecting and processing consumer transactions.

FIG. 3 is a flow diagram illustrating a process that can be performed by the event engine to detect and process consumer transactions. At 301, the process determines whether information representing a new card transaction has been received (i.e., based on the transaction feed received from the card processor). If no such information has been received, the process loops back to 301. If information representing a new transaction has been received, then at 302 the process compares the transaction information to the stored rules in the rules and results database. The process then determines at 303 whether the transaction matches any rule in the rules and results database. If there is no match, this means that no new acceptance by a consumer of an offer has been detected, in which case the process loops back to 301.

If the transaction does match a rule in the rules and results database, this means that a consumer has accepted an offer, in which case the process generates an "Offer Accepted" event at 304. After generating an "Offer Accepted" event, the process at 305 sends a credit message to the card issuer (which might be the consumer's bank) to cause a transfer of funds from the campaign account to the consumer's account. The process also sends a message to the consumer at 306, notifying the consumer of the transfer of funds. Note that operation 305 is not necessarily a prerequisite to performing operation 306; that is, the notification message sent to the consumer at 306 can potentially be sent concurrently with or even prior to the actual transfer of funds or the message which triggers the transfer of funds. At 307 the process updates the offer results in the rules and results database and removes the rule which represented the accepted offer.

Figure 4:
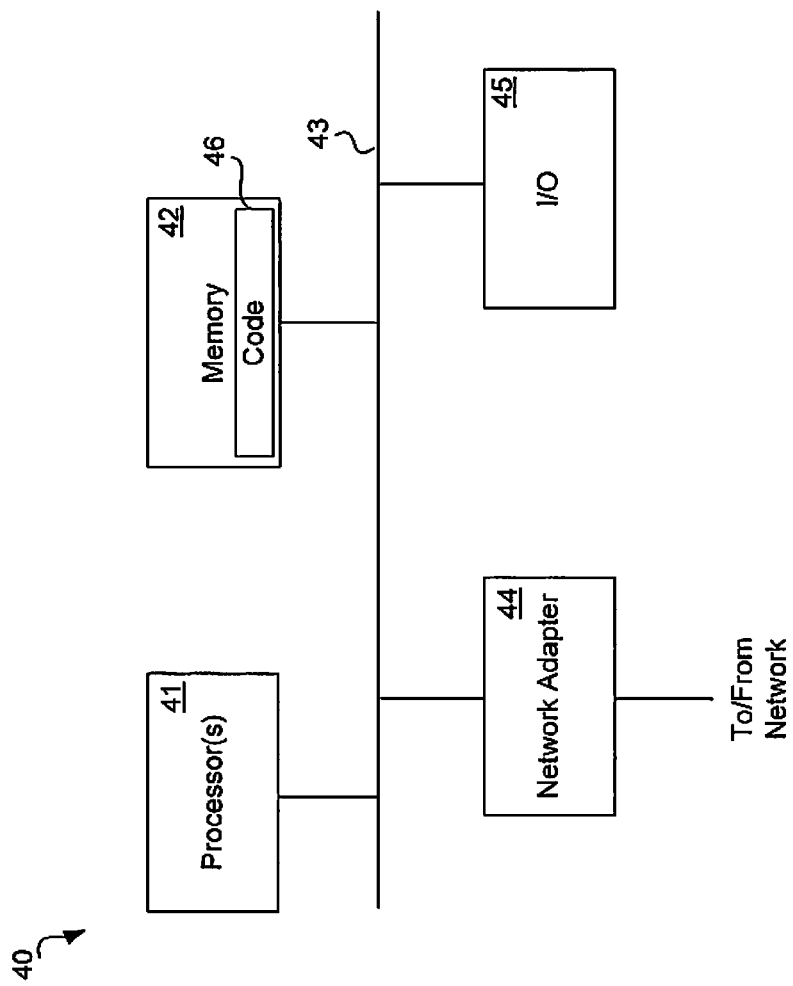
FIG. 4 is a high-level block diagram of a processing system in which a process of sending targeted offers to consumers and detecting acceptance of such offers can be implemented.

FIG. 4 is a high-level block diagram of a processing system in which any or all of the above described elements and processes can be implemented. The processing system 40 may be, for example, a conventional server class computer system. The processing system 40 includes one or more processors 41 and memory 42 coupled to an interconnect 43. The interconnect 43 shown in FIG. 4 is an abstraction that represents any one or more separate physical buses, point-to-point connections, or both, connected by appropriate bridges, adapters, or controllers. The interconnect 43, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 41 is/are the central processing unit (CPU) of the processing system 40 and, thus, control the overall operation of the processing system 40. In certain embodiments, the processor(s) 41 accomplish this by executing software or firmware stored in memory 42. The processor(s) 41 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 42 is or includes the main memory of the processing system 40. The memory 42 represents any form of random access memory (RAM), read-only memory (ROM), flash memory, or the like, or a combination of such devices. In use, the memory 422 may contain, among other things, code 46 for implementing some or all of the techniques described above.

Also connected to the processor(s) 41 through the interconnect 43 are a network adapter 44 and (optionally) one or more other input/output (I/O) devices 45. The network adapter 44 provides the processing system 40 with the ability to communicate with remote devices over a network and may be, for example, an Ethernet adapter or Fibre Channel adapter.

Thus, a system and method for providing timed, targeted promotional offers to individual credit/debit card users (consumers), with timely and specific feedback, have been described.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    determining in a computer system when a promotional offer which is associated with a credit/debit card account of a particular consumer should be released to the particular consumer;
    in response to a determination in the computer system that the promotional offer should be released to the particular consumer, storing a rule representing the promotional offer in a rules database, the rule specifying the particular consumer, a merchant to which the promotional offer applies and a time frame during which the promotional offer is valid, and causing an alert indicating the promotional offer to be delivered to a mobile device of the particular consumer via a cellular communications network, the alert indicating the merchant to which the promotional offer applies and the time frame during which the promotional offer is valid;

receiving, at the computer system, information representing a plurality of consumer credit/debit transactions;

comparing, in the computer system, information representing each of the consumer credit/debit transactions to the rules database to determine if there is a match between any of the consumer credit/debit transactions and a rule representing a promotional offer in the rules database;

in response to identifying a match between one of the consumer credit/debit transactions and a rule representing a promotional offer in the rules database, automatically transmitting a first message to a financial institution to cause a transfer of funds to the credit/debit card account of the particular consumer; and in response to identifying the match between the one of the consumer credit/debit transactions and the rule representing the promotional offer in the rules database, immediately transmitting a second message to the mobile device of the particular consumer via a cellular communications network to notify the particular consumer of the transfer of funds.

2. A method as recited in claim 1, wherein said determining when the promotional offer should be released to the particular consumer is based on a behavior of the particular consumer.

3. A method as recited in claim 1, wherein the information representing the plurality of consumer credit/debit transactions comprises a real-time stream of information representing consumer credit/debit transactions.

4. A method as recited in claim 1, wherein receiving the information representing the plurality of consumer credit/debit transactions comprises receiving the information representing the plurality of consumer credit/debit transactions from a credit/debit card processor.

5. A processing system comprising:

a processor;

a rules database, operatively coupled to the processor, to store a plurality of rules representing a plurality of promotional offers made to different consumers;

an offer release module to determine when a particular promotional offer which is associated with a payment account of a particular consumer should be released to the particular consumer and to cause a rule representing the particular promotional offer to be stored in the rules database when the particular promotional offer is released to the particular consumer;

a message delivery module to cause a first message indicating the particular promotional offer to be delivered to a mobile device of the particular consumer via a cellular communications network; and an event engine to compare information representing a plurality of consumer payment transactions to the rules database to determine if there is a match between any of the plurality of consumer payment transactions and a rule in the rules database, and in response to identifying said match, to trigger a second message for causing a transfer of funds to the payment account of the particular consumer and a third message for notifying the particular consumer of the transfer of funds.

6. A processing system as recited in claim 5, wherein the rule specifies the particular consumer, a merchant to which the promotional offer applies and a time frame during which the promotional offer is valid.

7. A processing system as recited in claim 5, wherein the first message indicates a merchant to which the promotional offer applies and a time frame during which the promotional offer is valid.

8. A processing system as recited in claim 5, wherein the event engine further triggers a third message in response to identifying a match between one of the consumer payment transactions and a rule in the rules database, the third message being destined for the particular consumer and confirming the transfer of funds to the payment account of the particular consumer.

9. A processing system as recited in claim 5, wherein the offer release module determines when the promotional offer should be released to the particular consumer based on a behavior of the particular consumer.

10. A processing system as recited in claim 5, wherein the information representing the plurality of consumer payment transactions comprises a real-time stream of information representing consumer credit/debit transactions.

11. A processing system as recited in claim 5, wherein the plurality of payment transactions are credit/debit transactions.

12. A processing system as recited in claim 11, wherein the information representing a plurality of consumer credit/debit transactions is received by the processing system from a credit/debit card processor.

13. A processing system as recited in claim 5, wherein the third message is sent to the mobile device of the particular consumer.

14. A processing system comprising:

a processor;

a network communicate device through which to communicate data with a remote system via a network; and a machine readable storage medium storing instructions which, when executed by the processor, cause the processing system to perform a process that includes:

determining a time at which a promotional offer associated with a credit/debit card account of a particular consumer should be released to the particular consumer, wherein the determined time at which the promotional offer should be released to the particular consumer is not dependent upon a present location of the particular consumer;

in response to a determination that the promotional offer should be released to the particular consumer, storing a rule representing the promotional offer in a rules database, the rule specifying the particular consumer, a merchant to which the promotional offer applies and a time frame during which the promotional offer is valid, and causing an alert indicating the promotional offer to be delivered to a mobile device of the particular consumer via a cellular communications network, the alert indicating the merchant to which the promotional offer applies and the time frame during which the promotional offer is valid;

receiving information representing a plurality of consumer credit/debit transactions;

detecting that the particular consumer has accepted the promotional offer, by comparing information representing each of the plurality of consumer credit/debit transactions to the rules database to detect a match between any of the consumer credit/debit transactions and the rule representing the promotional offer in the rules database;

in response to detecting that the particular consumer has accepted the promotional offer, causing a first message to be transmitted automatically to a financial institution to cause a transfer of funds to the credit/debit card account of the particular consumer; and in response to detecting that the particular consumer has accepted the promotional offer, immediately causing a second message to be transmitted to a personal mobile device of the particular consumer via the cellular communications network to notify the particular consumer of the transfer of funds.

15. A processing system as recited in claim 14, wherein said determining when the promotional offer should be released to the particular consumer is based on past behavior of the particular consumer.

16. A processing system as recited in claim 14, wherein the information representing the plurality of consumer credit/debit transactions comprises a real-time stream of information representing consumer credit/debit transactions.

17. A processing system as recited in claim 14, wherein receiving the information representing the plurality of consumer credit/debit transactions comprises receiving the information representing the plurality of consumer credit/debit transactions from a credit/debit card processor.

18. A processing system as recited in claim 14, wherein said process further comprises using an auction process to determine which promotional offer should be released to the particular consumer at a particular time.

19. A method as recited in claim 1, wherein a determined time at which the promotional offer should be released to the particular consumer is not dependent upon a present location of the particular consumer.

20. A method as recited in claim 1, further comprising using an auction process to determine which promotional offer should be released to the particular consumer at a particular time.

21. A processing system as recited in claim 5, wherein a determined time at which the promotional offer should be released to the particular consumer is not dependent upon a present location of the particular consumer.

22. A processing system as recited in claim 5, wherein an auction process is used to determine which promotional offer should be released to the particular consumer at a particular time.

* * * * *